United States Patent [19]

Wolk et al.

[11] 4,111,663
[45] Sep. 5, 1978

[54] REACTOR FOR SOLVENT REFINED COAL

[75] Inventors: Ronald H. Wolk; Norman C. Stewart, both of San Jose, Calif.

[73] Assignee: Electric Power Research Institute, Inc., Palo Alto, Calif.

[21] Appl. No.: 803,097

[22] Filed: Jun. 3, 1977

[51] Int. Cl.² .................... B01F 3/04; B01J 1/00; C10G 1/04
[52] U.S. Cl. .................. 422/191; 208/8; 208/10; 261/21; 261/149; 422/198; 422/200
[58] Field of Search ..... 23/283, 284, 285 (U.S. only), 23/288 H, 288 K, 288 E, 260 (U.S. only); 208/8, 9, 10; 261/21, 149, 114 R, 114 A, 123

[56] References Cited

U.S. PATENT DOCUMENTS

| | | | |
|---|---|---|---|
| 2,512,586 | 6/1950 | Stengel | 23/288 K |
| 2,707,163 | 4/1955 | Thibaut | 208/10 X |
| 3,197,286 | 7/1965 | Farkas et al. | 23/285 |
| 3,307,921 | 3/1967 | Junginger | 23/288 R |
| 3,475,134 | 10/1969 | Weber et al. | 23/283 X |
| 3,663,574 | 5/1972 | Yamagishi et al. | 23/283 X |
| 3,723,072 | 3/1973 | Carson et al. | 23/283 X |
| 3,839,191 | 10/1974 | Johnson | 208/8 X |

*Primary Examiner*—Joseph Scovronek
*Attorney, Agent, or Firm*—Townsend and Townsend

[57] ABSTRACT

An improved reactor and method for use in solvent refining of coal, wherein the reactor is divided into a number of compartments and has an inlet port at the bottom thereof for receiving a mixture of a solvent, coal, recycle gas and hydrogen. The compartments in the reactor are defined by a plurality of vertically spaced, perforated plates, each plate having bubble caps in the perforations thereof to permit an upflow of the feed mixture in which reactions occur as the mixture passes sequentially through the various compartments and to form vapor zones below the plates. In one embodiment, a coolant from an external source is directed into the regions below at least certain of the plates to control the reaction temperature in the zone above the plates by cooling the feed to the next sequential zone. In another embodiment, a portion of the gas below each plate is removed from the housing, cooled and then returned to the compartment above the plate to cool the reaction therein.

6 Claims, 2 Drawing Figures

U.S. Patent
Sept. 5, 1978
4,111,663
FIG. 1
FIG. 2
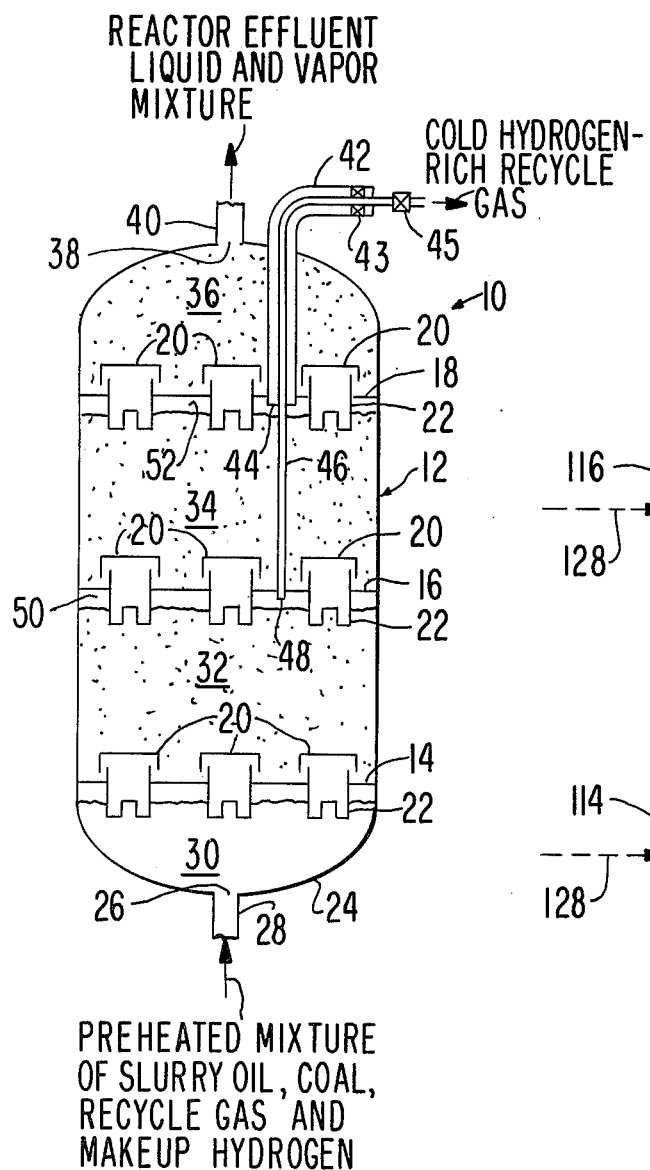
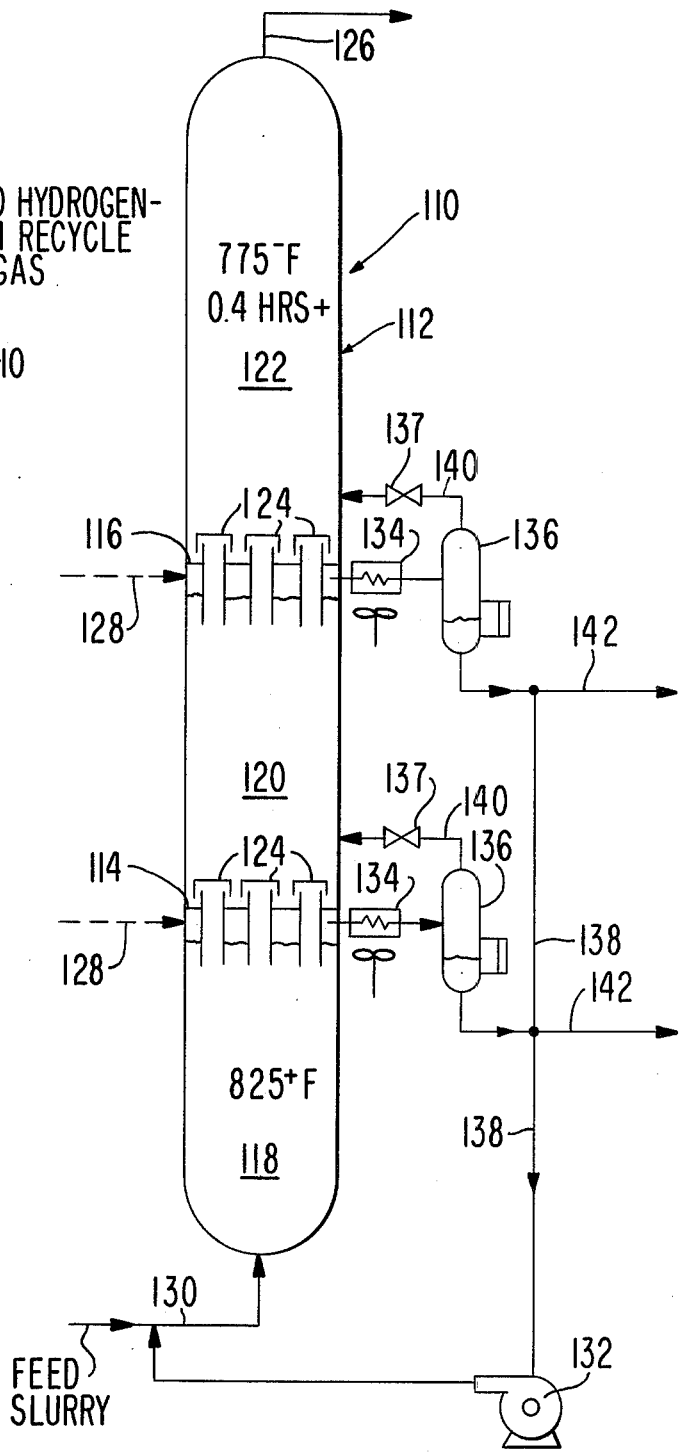

REACTOR FOR SOLVENT REFINED COAL

This invention was made under contract with or supported by the Electric Power Research Institute, Inc.

This invention relates to improvements in the solvent refining of coal and, more particularly, to a reactor and a method for using the same to improve the processing of solvent refined coal therein.

BACKGROUND OF THE INVENTION

In conventional solvent refined coal reactors, the amount of completion of the reaction in the reactor for desulfurization and hydrogenation is limited because the reactor is backmixed. If attempts are made to rectify this problem by subdividing the reactor into compartments, the temperature rise in each compartment becomes excessive because the reaction in each compartment is highly exothermic. To prevent the reaction from running away, some means must be provided to control the reaction. A need has, therefore, arisen for providing this control so that the reaction can be carried out in a more efficient manner than has been available up to the present time.

SUMMARY OF THE INVENTION

The present invention satisfies the foregoing need by providing apparatus and a method for solvent refining of coal wherein a coolant is directed in heat exchange relationship with mixtures of solvent, coal, recycle gas and hydrogen in a number of vertically spaced compartments of a reactor so that the reactions in the various compartments will not run away due to their characteristic of being highly exothermic. To this end, the apparatus of the invention includes a reactor having a closed housing divided into a number of vertically spaced compartments by perforated plate with each plate having a number of bubble caps in the perforations thereof to permit upflow of the mixture through the housing.

In a first embodiment of the invention, means is provided to direct a coolant, such as recycle gas, into the reactor housing and into the areas immediately below at least certain of the plates so that the coolant can be used least certain of the plates so that the coolant can be used to cool the mixture passing to the next sequential zone above it. It is important that the quenching gas be injected into the vapor pocket beneath each distributor plate and not into the liquid pool below that plate. In this way, the temperature in the liquid pool is not affected and the temperature in the vertical zone above it can be controlled to the desired level. In a second embodiment of the invention, a portion of the gas in the space beneath each of the plates is removed from the housing, is then cooled externally of the housing, and then returned into the region above that same plate, thereby cooling the mixture therewithin.

In either case, the reaction in each compartment is quenched to the extent that it will continue but will not run away as the mixture flows upwardly through the reactor housing. At the top of the reactor housing, the mixture is removed through an exit port to a location downstream of the reactor where the liquefied coal molecules are separated from hydrogen sulfide and other compounds.

The primary object of this invention is to provide an improved reactor and method for solvent refining of coal wherein the reactor is divided into a number of vertically spaced compartments in which reactions between a solvent, coal, recycle gas and hydrogen can occur and in which a coolant is directed in heat exchange relationship to the mixture in the compartment so that the reactions which are normally exothermic will be controlled and will not run away.

Another object of this invention is to provide apparatus and a method of the type described wherein a coolant is moved beneath the perforated plates dividing the reactor into a number of vertically spaced compartments so that the feed temperature of the mixture entering that zone is lower than that of the liquid in the compartment below. This action controls the temperature in the zone above the plate to the desired level.

Still another object of this invention is to provide apparatus and a method of the aforesaid character wherein a portion of the gas and vapor beneath each of the perforated plates of the reactor is removed from the reactor and cooled, then is returned to the compartment above the corresponding plate for heat exchange with the mixture in the compartment to thereby cool the mixture and to control the reaction therewithin.

Other objects of this invention will become apparent as the following specification progresses, reference being had to the accompanying drawing for an illustration of several embodiments of the invention.

IN THE DRAWINGS

FIG. 1 is a vertical section through the reactor forming a first embodiment of the invention; and FIG. 2 is a schematic view of a reactor and associated external fluid flow network forming a second embodiment of the invention.

The first embodiment of the reactor of this invention is broadly denoted by the numeral 10 and is illustrated in FIG. 1. Reactor 10 includes a cylindrical housing 12 divided into a number of stages by a group of vertically spaced, perforated, horizontal plates 14, 16 and 18. Each perforation of the plates is provided with a bubble cap 20 which has a continuous sidewall 22 extending a distance below the plate, such as 6 inches or the like. Sidewall 22 has spaced slots formed in the lower margin thereof for approximately one-half of its length. This assures that the space below each plate will receive and trap a gas hereinafter described for cooling purposes.

Housing 12 has a bottom 24 provided with an inlet port 26 to which a pipe 28 is coupled. A preheated mixture of slurry oil, coal, recycle gas and makeup hydrogen is inserted under pressure into the lowermost compartment 30 above bottom 24. The mixture rises through the bubble caps 20 of plate 14 and into compartment 32 immediately above plate 14. The exchange continues up through the bubble caps and plate 16 into compartment 34, then through the bubble caps and plate 18 into compartment 36 and out through the top port 38 in the top of housing 12 and through a pipe 40. Hydrogen, hydrogen sulfide and liquid gases are separated from other liquefied coal molecules and are separated from one another at stations downstream of housing 12.

To prevent an excessive temperature rise of the reacting components in compartments 34 and 36, hydrogen-rich recycle gas is directed into the areas immediately beneath plates 16 and 18. To this end, a first delivery tube 42 extends through plate 18 and terminates immediately below the same at the lower end 40. Similarly, a second delivery tube 46 extends through plate 16 and has a lower end 48 terminating immediately below plate 16. Quench gas is injected through pipes 42 and 46 and controlled individually by control valves 43 and 45 and since the quench gas does not mix with the liquid in compartments 32 and 34, the gas moves into spaces 50 and 52 beneath plates 16 and 18, respectively, to cool the mixtures entering compartments 34 and 36, respectively. This cooling effect prevents excessive temperature rise in compartments 34 and 46 so that the reactions in these regions do not run away.

The use of horizontal plates 14, 16 and 18 uniformly distributes the gas and liquid flowing upwardly through the reactor. This prevents the formation of high velocity eddies, which would otherwise tend to reduce the accumulation of solids within respective compartments 32, 34 and 36. Solids help hydrogenation by acting as catalysts or merely as surfaces to contact hydrogen and liquefied coal molecules. Solids from coal consist of iron, silica, alumina, sodium, calcium and other metallic oxides and sulfides.

In another embodiment of the invention, a reactor 110 includes a housing 112 provided with two or more perforated plates, such as plates 114 and 116, for dividing the housing into a number of compartments 118, 120 and 122. For each perforated plate, there are a number of bubble caps 124 which allow gas and liquid upflow in the housing so that the mixture which includes liquid coal particles, hydrogen, hydrogen sulfide and other light gases can leave the housing along a line 126 at the top of the housing. Recycle gas can be added from an external source along lines 128 into the regions immediately below plates 114 and 116 to provide cooling if desired. A preheated mixture of slurry oil, coal, recycle gas and makeup hydrogen are directed into housing 112 at the bottom thereof by way of line 130.

To enhance the cooling action of the gas in the regions below each of plates 114 and 116, a part of the gas in each region is drawn out of housing 112 through a heat exchanger 134, such as an air-cooled unit. The cooled gas is then sent to a separator 136 where the condensate is separated from the gas, the condensate being returned by line 138 to line 130 by way of pump 132. The gas from separator 136 is then directed along a line 140 and reinjected into housing 112 through control valve 137 and into compartment 120 in heat exchange relationship to the mixture therein for cooling the reaction mixture to prevent the reaction from running away. The pressure drop caused by vapors and gases flowing through exchanger 134 is less than the pressure drop caused by the flow of reactants across plates 114 and 116. The amount of flow passing through exchanger 134, separator 136 and line 140 is controlled by valve 137. A solvent with low hydrogen content can be taken off at lines 142 if desired.

It can be seen that both embodiments provide structure and method for quenching or cooling the reaction of the mixture in specific compartments of the reactor. This is done in a simple manner and at minimum operating cost.

We claim:

1. A reactor for solvent refining of coal comprising: a reactor housing having a sidewall, a top and a bottom, said bottom having an inlet port for allowing a mixture of a solvent, coal, recycle gas and makeup hydrogen to be directed into the housing; at least a pair of vertically spaced, generally horizontal perforated plates disposed within the housing to divide the interior of the housing into respective compartments, each plate having a bubble cap in each perforation thereof, respectively, the bubble caps of each plate having means causing the formation of a vapor zone beneath the plate and permitting upflow of a mixture of liquid and gas from each compartment and its vapor zone to the next compartment thereabove; and means coupled with the housing for directing a coolant into the vapor zones below at least certain of the plates to cool the vapor therein.

2. A reactor as set forth in claim 1, wherein said directing means includes conduit structure coupled with said housing and communicating with the vapor zone of each of said certain plates for directing a coolant into the region immediately below the plate.

3. A reactor as set forth in claim 2, wherein said conduit structure includes a first pipe for connection to a coolant source externally of the housing, the first pipe having an exit opening in the housing beneath the upper of two adjacent plates, and a second pipe adjacent to and extending longitudinally of the first pipe and having an exit opening in the region below the lower of the two plates.

4. A reactor as set forth in claim 3, wherein the second pipe is partially telescoped into the lower end of the first pipe.

5. A reactor as set forth in claim 2, wherein the conduit structure extends through the top of the housing and downwardly therefrom toward said certain plates.

6. A reactor as set forth in claim 1, wherein is included a heat exchanger coupled with the vapor zone beneath each of said certain plates for receiving a gas from the zone, means coupled with the heat exchanger for cooling the gas flowing therethrough to form a condensate, a separator coupled with the heat exchanger and operable to separate the gas from the condensate, a line and control valve coupled between the separator and the compartment above the corresponding plate to direct the cooled gas into said compartment, and pump means coupled with the separator for returning the condensate to the bottom of the reactor housing.

* * * * *